(12) United States Patent
Umemura et al.

(10) Patent No.: US 7,456,731 B2
(45) Date of Patent: Nov. 25, 2008

(54) CAPACITIVE-TYPE PHYSICAL QUANTITY SENSOR

(75) Inventors: Akinobu Umemura, Nagoya (JP); Junji Hayakawa, Okazaki (JP); Takaaki Kawai, Obu (JP)

(73) Assignee: DENSO CORPORATION, Kariya (JP)

( * ) Notice: Subject to any disclaimer, the term of this patent is extended or adjusted under 35 U.S.C. 154(b) by 269 days.

(21) Appl. No.: 11/415,230

(22) Filed: May 2, 2006

(65) Prior Publication Data

US 2006/0250267 A1 Nov. 9, 2006

(30) Foreign Application Priority Data

May 6, 2005 (JP) ............................. 2005-135100

(51) Int. Cl.
*G01P 15/125* (2006.01)
(52) U.S. Cl. .................. 340/436; 73/1.38; 73/514.32; 324/661; 324/679; 340/657; 340/669
(58) Field of Classification Search ............. 73/514.32, 73/1.38, 514.15, 514.18, 514.01, 514.16; 324/661, 679, 160–168, 548, 658; 340/436, 340/669, 657; 327/337, 344
See application file for complete search history.

(56) References Cited

U.S. PATENT DOCUMENTS

| | | | | |
|---|---|---|---|---|
| 5,325,065 A | * | 6/1994 | Bennett et al. | 324/661 |
| 5,751,154 A | * | 5/1998 | Tsugai | 324/661 |
| 5,977,803 A | * | 11/1999 | Tsugai | 327/94 |
| 5,986,497 A | * | 11/1999 | Tsugai | 327/554 |
| 6,240,782 B1 | | 6/2001 | Kato et al. | |
| 6,257,061 B1 | | 7/2001 | Nonoyama et al. | |
| 6,483,322 B2 | | 11/2002 | Aoyama et al. | |
| 6,952,966 B2 | * | 10/2005 | Itakura | 73/514.32 |

* cited by examiner

*Primary Examiner*—Brent Swarthout
(74) *Attorney, Agent, or Firm*—Posz Law Group, PLC

(57) ABSTRACT

A substrate forming a sensor element is connected to a non-inverting input terminal of an operational amplifier, and a common voltage is applied thereto from a reference voltage supply circuit to fix them to the same potential. Thus, the impedances of the non-inverting input terminal and of the inverting input terminal of the operational amplifier are matched with respect to the power source. Therefore, noise superposed on a power source line can be greatly decreased by noise-removing characteristics determined by CMRR characteristics of the operational amplifier. As a result, a capacitive-type acceleration sensor exhibits sensor characteristics of frequency noise suppressing effect.

10 Claims, 3 Drawing Sheets

CAPACITIVE-TYPE PHYSICAL QUANTITY SENSOR

CROSS REFERENCE TO RELATED APPLICATION

This application is based on and incorporates herein by reference Japanese Patent Application No. 2005-135100 filed on May 6, 2005.

FIELD OF THE INVENTION

This invention relates to a capacitive-type physical quantity sensor for detecting a physical quantity that is applied thereto based on a change in the capacitance when a physical quantity is given. This sensor is particularly suited for use in an acceleration sensor.

BACKGROUND OF THE INVENTION a capacitive-type acceleration sensor has heretofore been used in a vehicle. In the capacitive-type acceleration sensor, a change in the capacitance of a sensor element caused by a change in the acceleration is converted into an electric signal through a capacitance-voltage (C-V) conversion circuit, and the converted electric signal is differentially amplified through a differential amplifier circuit that includes a sample-holding circuit and a switched capacitor circuit thereby to produce a sensor output (e.g., U.S. Pat. No. 6,483,322 corresponding to JP 2002-40047A).

The capacitive-type acceleration sensors are generally constructed as represented by sensor circuit diagrams of FIGS. 2 and 3. In those sensors, a substrate a forming a sensor element 10 is separated from a substrate B forming a detector circuit 20. The detector circuit 20 includes a C-V conversion circuit 21, a differential amplifier circuit 22 and a control signal generation circuit 23 that produces control signals to various parts. The detector circuit 20 applies a voltage to moving electrodes 1a, 1b or to fixed electrodes 2a, 2b constituting the sensor element 10. The circuit 20 further processes signals by receiving differential signals from the sensor element 10. Concerning the substrates a and B which are separate from each other, the potential of the substrate a is fixed to a DC voltage (sensor drive voltage Vdd (FIG. 2) or GND potential (FIG. 3)), while the potential of the substrate B is fixed to the sensor drive voltage Vdd (e.g., U.S. Pat. No. 6,240,782 corresponding to JP 11-295336A).

To obtain a sensor output signal maintaining a high sensitivity by using the thus constituted a capacitive-type acceleration sensor, it becomes necessary to use the C-V conversion circuit 21 and the differential amplifier circuit 22 of high multiplying factors. However, the potential of the substrate A forming the sensor element 10 is fixed to the DC voltage. If this potential is applied to the C-V conversion circuit 21, the frequency noise is superposed on the differential signals input to the input terminals of the C-V conversion circuit 21 due to mismatching of impedances of the inverting input terminal and non-inverting input terminal of the C-V conversion circuit 21 with respect to the power source. As a result, the frequency noise is amplified at the time of C-V conversion and is added to the sensor output signals. This makes it difficult to obtain sensor characteristics of a high degree.

SUMMARY OF THE INVENTION

The present invention aims at providing a capacitive-type physical quantity sensor capable of providing sensor characteristics of a high degree suppressing adverse effect of frequency noise.

According to the present invention, a first substrate forming a sensor element is separated from a second substrate forming a detector circuit. A C-V conversion circuit is provided with a reference voltage supply circuit for supplying a reference voltage which is one-half the amplitude of a carrier wave to a non-inverting input terminal of an operational amplifier. The first substrate terminal of the operational amplifier. The potential of the first substrate is fixed to the reference potential formed by the reference voltage supply circuit.

By connecting the first substrate forming the sensor element to the non-inverting input terminal of the operational amplifier, and by applying a common voltage, for instance one-half the amplitude of a carrier wave applied to the sensor element, from the reference voltage supply circuit so that they are fixed to the same potential, it becomes possible to match the impedances of the non-inverting input terminal and of the inverting input terminal of the operational amplifier with respect to the power source. Thus, noises superposed on a power source line are applied to both input terminals of the operational amplifier in the same phase and hence can be greatly decreased due to noise-removing characteristics determined by the CMRR characteristics of the operational amplifier. As a result, the capacitive-type acceleration sensor exhibits sensor characteristics that suppresses adverse effect caused by frequency noise.

BRIEF DESCRIPTION OF THE DRAWING

The above and other objects, features and advantages of the present invention will become more apparent from the following detailed description made with reference to the accompanying drawings. In the drawings.

DESCRIPTION OF THE PREFERRED EMBODIMENTS

Figure 1:
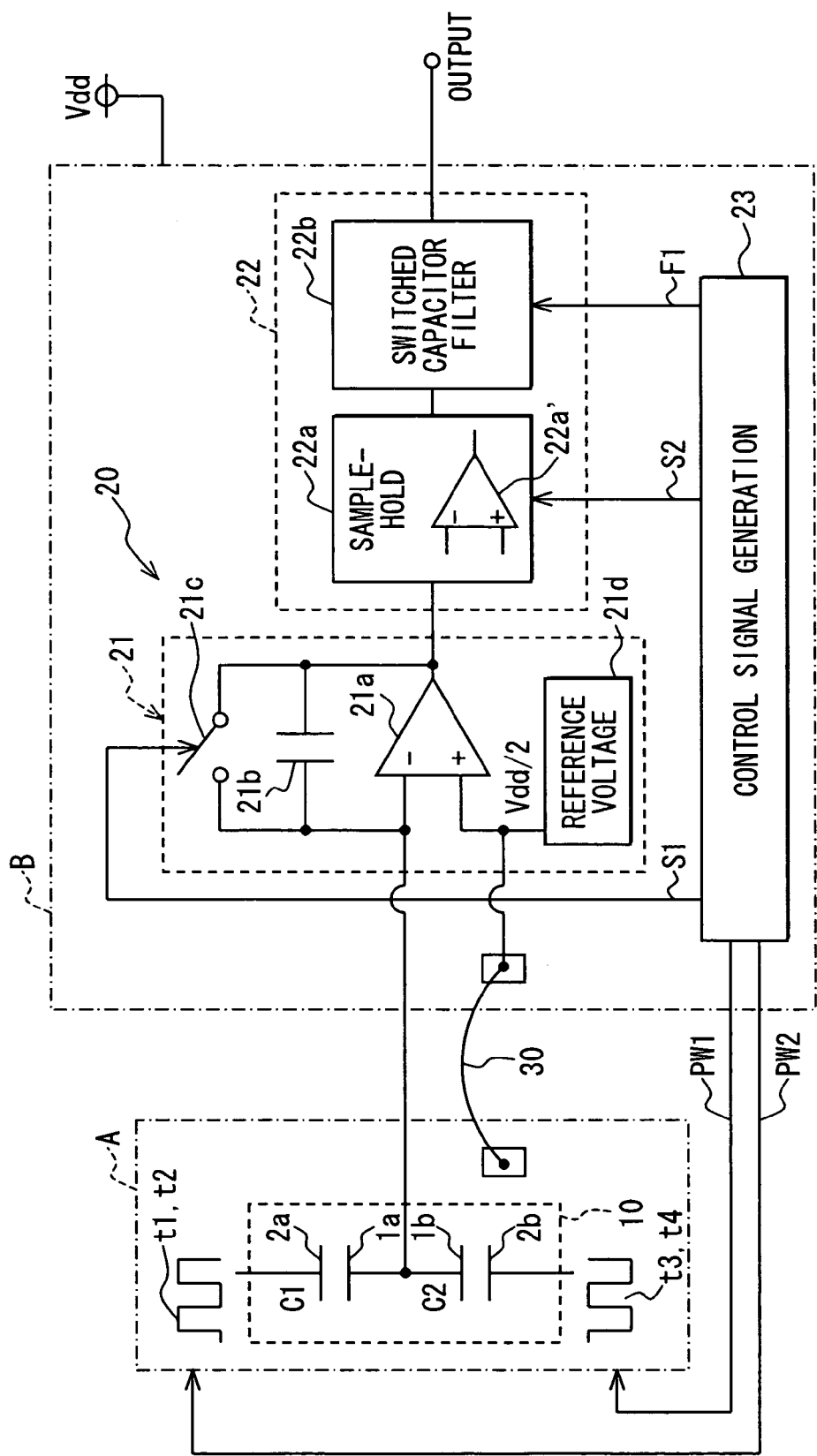
FIG. 1 is a circuit diagram of a capacitive-type acceleration sensor according to a first embodiment of the present invention.
Figure 2:
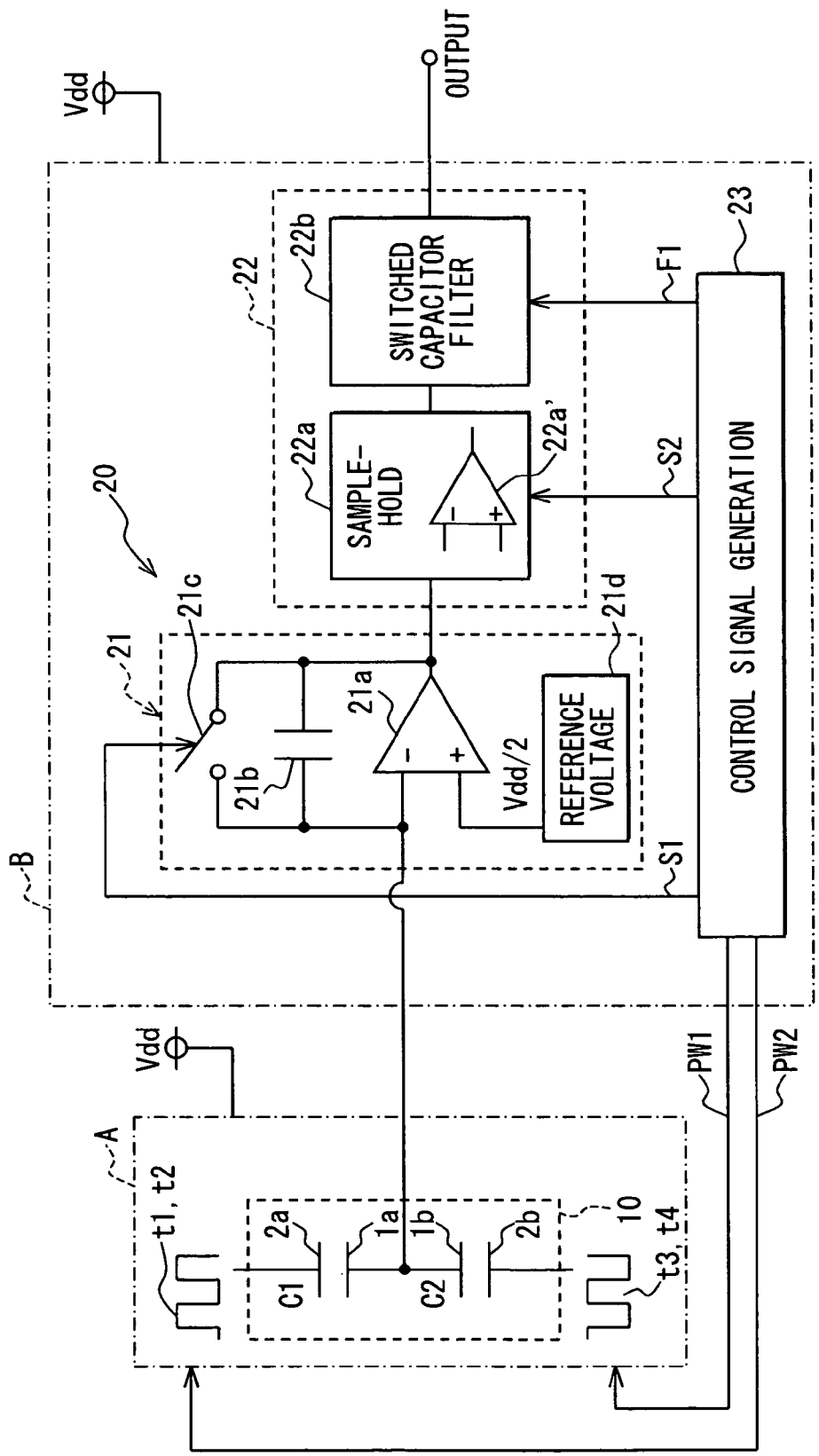
FIG. 2 is a circuit diagram of a conventional capacitive-type acceleration sensor.
Figure 3:
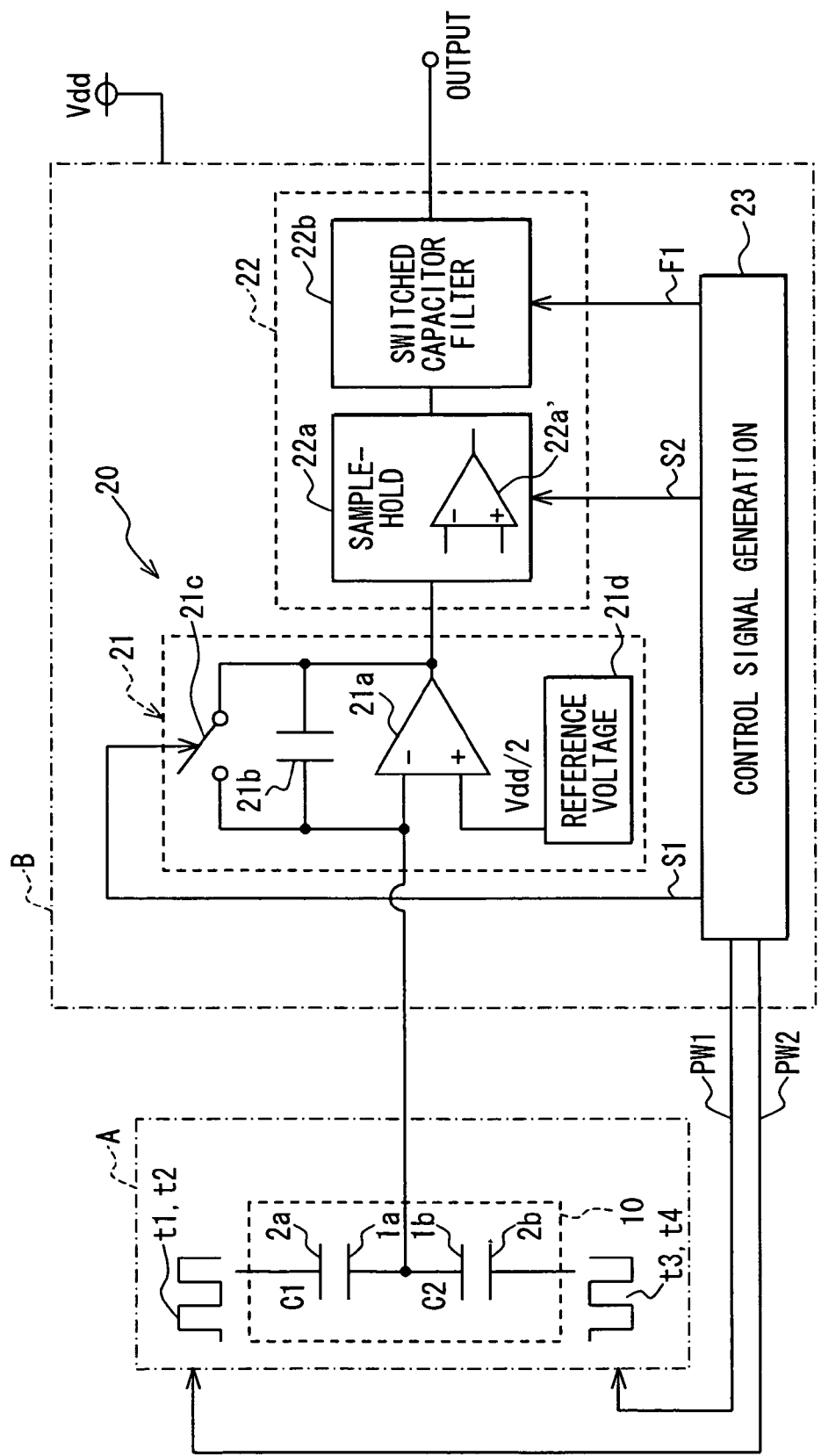
FIG. 3 is a circuit diagram of another conventional capacitive-type acceleration sensor.

Referring to FIG. 1, a capacitive-type acceleration sensor is constructed with a sensor element 10 having moving electrodes 1a, 1b and fixed electrodes 2a, 2b, and a detector circuit 20 for detecting acceleration applied to the sensor element 10 based on a change in the differential capacitance constituted by the moving electrodes 1a, 1b and the fixed electrodes 2a, 2b.

In the sensor element 10, the moving electrodes 1a, 1b and the fixed electrodes 2a, 2b are formed in the beam structure. a differential capacitance is provided by the moving electrode 1a and the fixed electrode 2a and by the moving electrode 1b and the fixed electrode 2b that are arranged in an opposing manner. Upon application of periodic signals (carrier waves) PW1 and PW2 inverted in polarity relative to each other to the fixed electrodes 2a and 2b, the acceleration is detected based upon a change in the differential capacitance dependent upon a displacement of the moving electrodes 1a, 1b relative to the fixed electrodes 2a, 2b.

On the other hand, the detector circuit 20 includes a C-V conversion circuit 21, a differential amplifier circuit 22 and a control signal generation circuit 23.

The C-V conversion circuit 21 includes an operational amplifier 21a, a capacitor 21b, a switch 21c and a reference voltage supply circuit 21d, and converts into a voltage a change in the differential capacitance provided by the moving electrodes 1a, 1b and the fixed electrodes 2a, 2b. The inverting input terminal of the operational amplifier 21a is connected to the moving electrodes 1a and 1b. The capacitor 21b and the switch 21c are connected in parallel between the inverting input terminal and the output terminal thereof. The switch 21c is driven by a signal S1 from the control signal generation circuit 23. The non-inverting input terminal of the operational amplifier 21a receives a reference voltage formed by the reference voltage supply circuit 21d. Specifically, the reference voltage supply circuit 21d forms a voltage Vdd/2 (i.e., a reference voltage of, for example, 2.5 V) which is one-half the voltage Vdd (e.g., 5 V) applied to the fixed electrodes 2a, 2b. This voltage is input to the non-inverting input terminal of the operational amplifier 21a.

The differential amplifier circuit 22 includes a sample-holding circuit 22a and a switched-capacitor filter (SCF) circuit 22b. The sample-holding circuit 22a is driven based on a signal S2 from the control signal generation circuit 23 to sample the output of the C-V conversion circuit 21 and holds it for a predetermined period of time after the signal S2. The sample-holding circuit 22a includes a differential amplifier 22a' to produce a differential voltage between sampled voltages previously sampled and presently sampled.

The SCF circuit 22b is driven based on a clock signal F1 from the control signal generation circuit 23 to take out components of only a predetermined frequency band from the output voltage of the sample-holding circuit 22a, and outputs an output signal as an acceleration signal.

The control signal generation circuit 23 produces the voltage signals (carrier waves) PW1, PW2 of predetermined periods, the signal S1 indicating a timing for switching the switch 21c, the control signal S2 for the sample-holding circuit 22a and the clock signal F1 for driving the SCF circuit 22b.

The sensor element 10 and the detector circuit 20 are formed on separate substrates, i.e., substrate a and substrate B. The electric connection to the substrates a and B are accomplished by wire bonding. Specifically, the non-inverting input terminal of the operational amplifier 21a in the C-V conversion circuit 21 is electrically connected to the substrate a forming the sensor element 10 through a wire 30 and, hence, the potential of the substrate A becomes equal to the potential at the non-inverting input terminal of the operational amplifier 21a, i.e., becomes equal to the reference voltage Vdd/2 formed by the reference voltage supply circuit 21d.

The parts having the wire bonding are shown in a simplified schematic manner in FIG. 1. In practice, however, the electric connection is accomplished through wires between the moving electrodes 1a, 1b in the sensor element 10 and the inverting input terminal of the operational amplifier 21a of the C-V conversion circuit 21, and between the control signal generation circuit 23 and the fixed electrodes 2a, 2b. a differential signal of the sensor element 10 is input to the C-V conversion circuit 21 through a wire, and voltage signals (carrier waves) PW1 and PW2 output from the control signal generation circuit 23 are input to the fixed electrodes 2a and 2b.

In operation, signals PW1 and PW2 output from the control signal generation circuit 23 have an amplitude of the voltage Vcc (e.g., 5 V) of voltage levels which are inverted in phase relative to each other, and are rectangular wave signals having a predetermined amplitude of which the high level (Hi) and the low level (Low) varies in four periods t1 to t4.

In the first period t1, first, the potential of the fixed electrode 2a becomes V and the potential of the fixed electrode 2b becomes 0 based on the signals PW1 and PW2, and the switch 21c is closed due to the signal S1 from the control signal generation circuit 23. Due to the operation of the operational amplifier 21a, therefore, the moving electrodes 1a and 1b are biased to the potential V/2, and an electric charge stored between the electrodes of the capacitor 21b that serves as a feedback capacitor is discharged.

Here, when there holds a relationship C1>C2 between a capacitance C1 across the moving electrode 1a and the fixed electrode 2a and a capacitance C2 across the moving electrode 1b and the fixed electrode 2b, the moving electrodes 1a and 1b are placed in a state where there is much negative electric charge from the above relationship and from a relationship of potentials applied to the fixed electrodes 2a and 2b.

Next, in the second period t2, the potential of the fixed electrode 2a becomes V and the potential of the fixed electrode 2b becomes 0 based on the signals PW1 and PW2 as in the first period t1. However, the switch 21c is opened due to the signal S1 from the control signal generation circuit 23. Therefore, the electric charge is stored in the capacitor 21b depending upon the state of the moving electrodes 1a and 1b. When a voltage dependent upon the electric charge stored in the capacitor 21b is output from the C-V conversion circuit 21, the output voltage of the C-V conversion circuit 21 is sampled by the sample-holding circuit 22a depending upon the signal S2.

Thereafter, in the third period t3, the potentials are so reversed that the potential of the fixed electrode 2a becomes 0 and the potential of the fixed electrode 2b becomes V based on the signals PW1 and PW2, and the switch 21c is maintained opened due to the signal S1 from the control signal generation circuit 23.

Here, the states of electric charges of the moving electrodes 1a and 1b are reversed to those of during the second period t2 due to the inversion of the signals PW1 and PW2. That is, when the relationship C1>C2 is satisfied, there is established a state where there is much positive electric charge on the moving electrodes 1a and 1b due to the inversion of the potentials applied to the fixed electrodes 2a and 2b.

Here, however, the circuit is closed between the moving electrodes 1a, 1b and the capacitor 21b, and the amount of electric charge of the first period t1 is preserved. Therefore, the electric charge overflowing from the balancing amount of electric charge of the moving electrodes 1a, 1b migrates into the capacitor 21b and is stored therein. From a relationship Q=CV, therefore, the C-V conversion circuit 21 produces a voltage which is proportional to the amount of electric charge that has migrated but is inversely proportional to the capacitance C of the capacitor 21b.

Further, in the fourth period t4, i.e., the potential of the fixed electrode 2a becomes 0 and the potential of the fixed electrode 2b becomes V based on the signals PW1 and PW2. When the output of the C-V conversion circuit 21 is stabilized to a sufficient degree, then, the output voltage of the C-V conversion circuit 21 is sampled by the sample-holding circuit 22a based on the signal S2.

Finally, the voltage sampled in the second period t2 and the voltage sampled in the fourth period t4 are put to the differential operation through the differential amplifier 22a' in the sample-holding circuit 22a, and the result thereof is output. This output enables the acceleration to be detected depending upon the displacement of the moving electrodes 1a and 1b.

In this embodiment, the non-inverting input terminal of the operational amplifier 21a in the C-V conversion circuit 21 is electrically connected to the substrate a forming the sensor element 10 through the wire 30, and the potential of the substrate a becomes equal to the potential at the non-inverting input terminal of the operational amplifier 21a, i.e., becomes equal to the reference voltage Vdd/2 formed by the reference voltage supply circuit 21d.

Thus, the substrate a forming the sensor element 10 is connected to the non-inverting input terminal of the operational amplifier 21a, and a common voltage is applied thereto from the reference voltage supply circuit 21d to fix them at the same potential, making it possible to match the impedances of the non-inverting input terminal and of the inverting input terminal of the operational amplifier 21a with respect to the power source. Therefore, the noise superposed on the power source line can be greatly decreased due to the noise-removing characteristics determined by the CMRR characteristics of the operational amplifier 21a. As a result, the capacitive-type acceleration sensor is enabled to exhibit sensor characteristics of superior noise suppressing effect.

In the above embodiment, an acceleration sensor is described as a capacitive-type physical quantity sensor. The invention, however, can further be applied to any other sensors, such as a pressure sensor and a yaw rate sensor.

What is claimed is:

1. A capacitive-type physical quantity sensor comprising:
   first and second substrates provided separately;
   a sensor element formed on the first substrate and having moving electrodes and first and second fixed electrodes, the moving electrodes undergoing a displacement depending upon a change in physical quantity, and the first and second fixed electrodes being arranged to face the moving electrodes and receive periodic carrier waves having phases opposite to each other; and
   a detector circuit formed on the second substrate and including a C-V conversion circuit that receives a signal that varies depending upon a change in a capacitance formed between the moving electrodes and the first and second fixed electrodes, the detector circuit producing a voltage that varies depending upon a change in the capacitance, wherein
      the C-V conversion circuit includes an operational amplifier and a reference voltage supply circuit, the operational amplifier having a first input terminal to receive a signal that varies depending upon a change in the capacitance and a second input terminal to receive a reference voltage of the reference voltage supply circuit, and wherein
      the first substrate is electrically connected to the second input terminal of the operational amplifier so that the voltage of the first substrate is fixed to the reference voltage of the reference voltage supply circuit.

2. The capacitive-type physical quantity sensor as in claim 1, wherein
   the C-V conversion circuit further includes a capacitor connected between an output terminal of the operational amplifier and the first input terminal which is inverting, and a switch connected in parallel with the capacitor, and wherein
   the reference voltage is set to one-half of an amplitude of the carrier waves.

3. The capacitive-type physical quantity sensor as in claim 2, wherein
   the detector circuit further includes a differential amplifier circuit which holds the output voltage of the C-V conversion circuit and differentially amplifies voltages applied presently and previously, and a control signal generation circuit that generates the carrier waves, a signal for turning the switch, on and off and control signals for the differential amplifier circuit.

4. The capacitive-type physical quantity sensor as in claim 1, wherein
   the sensor element is responsive to acceleration of the first substrate.

5. The capacitive-type physical quantity sensor as in claim 1, wherein
   the voltage of the first substrate is continuously maintained at the reference voltage while the period carrier waves are applied to the first and second fixed electrodes.

6. The capacitive-type physical quantity sensor as in claim 1, wherein
   the periodic carrier waves that are opposite in phase are inverted in phase relative to each other, and are rectangular wave signals having a predetermined amplitude of which a high level and a low level vary over time.

7. The capacitive-type physical quantity sensor as in claim 3, wherein
   the periodic carrier waves that are opposite in phase are inverted in phase relative to each other, and are rectangular wave signals having a predetermined amplitude of which a high level and a low level vary over time.

8. The capacitive-type physical quantity sensor as in claim 3, wherein
   the differential amplifier circuit includes a sample-holding circuit configured to hold the output voltage of the C-V conversion circuit and differentially amplify voltages applied presently and previously.

9. The capacitive-type physical quantity sensor as in claim 7, wherein
   the differential amplifier circuit further includes a switched-capacitor filter configured to filter out components of a predetermined frequency band from the output voltage of the sample-holding circuit and output a signal as an acceleration signal.

10. The capacitive-type physical quantity sensor as in claim 1, wherein
    the first input terminal is an inverting terminal of the operational amplifier and the second input terminal is the non-inverting terminal of the operational amplifier.

* * * * *